United States Patent [19]

Barnes

[11] 4,174,028

[45] Nov. 13, 1979

[54] METHOD AND APPARATUS FOR ORIENTING AND STORING SIMILAR ARTICLES

[75] Inventor: Gerald Barnes, South Orange, N.J.

[73] Assignee: Amerace Corporation, New York, N.Y.

[21] Appl. No.: 905,464

[22] Filed: May 12, 1978

Related U.S. Application Data

[60] Continuation of Ser. No. 479,255, Jun. 13, 1974, abandoned, which is a division of Ser. No. 270,191, Jul. 10, 1972, Pat. No. 3,831,736, which is a division of Ser. No. 30,817, Apr. 22, 1970, abandoned, which is a continuation of Ser. No. 605,769, Dec. 29, 1966, abandoned.

[51] Int. Cl.² .............................................. B65G 47/44
[52] U.S. Cl. .................................. 198/389; 198/526; 198/531; 221/175; 221/290
[58] Field of Search ............... 198/389, 491, 502, 524, 198/526, 530–532, 857; 221/159, 164, 165, 171, 172, 175, 183, 290, 294

[56] References Cited

U.S. PATENT DOCUMENTS

| | | | |
|---|---|---|---|
| 2,662,633 | 12/1953 | Kingsley | 198/389 |
| 2,764,351 | 9/1956 | Broscomb et al. | 198/389 |
| 2,819,816 | 1/1958 | Moeltzner et al. | 221/183 |
| 2,832,458 | 4/1958 | Ferguson et al. | 198/389 |
| 2,858,873 | 11/1958 | Snow | 221/290 |
| 3,066,826 | 12/1962 | Ullman et al. | 221/175 |
| 3,133,670 | 5/1964 | Heyer | 221/175 |
| 3,189,157 | 6/1965 | Batchelder | 198/389 |
| 3,567,006 | 3/1971 | Bell et al. | 198/857 |
| 3,572,491 | 3/1971 | Wylie | 198/491 |
| 3,907,099 | 9/1975 | Smith | 198/389 |

Primary Examiner—Joseph E. Valenza
Attorney, Agent, or Firm—Richard A. Craig

[57] ABSTRACT

An unoriented supply of similar articles, each having a shank and a head of greater dimension than the shank are introduced into orienting means which include a trough having an inclined slot at its bottom and a plurality of cleats positioned at fixed locations on its side walls. Upon vibration, the articles become separated resulting in certain of the articles becoming oriented within the slot, with the unoriented articles being returned to the supply. The oriented articles are then directed to storing means which include a track including a straight lower portion, level maintaining means and a discharge end wherein the articles are discharged at a predetermined rate to article receiving, positioning and carrying means.

4 Claims, 21 Drawing Figures

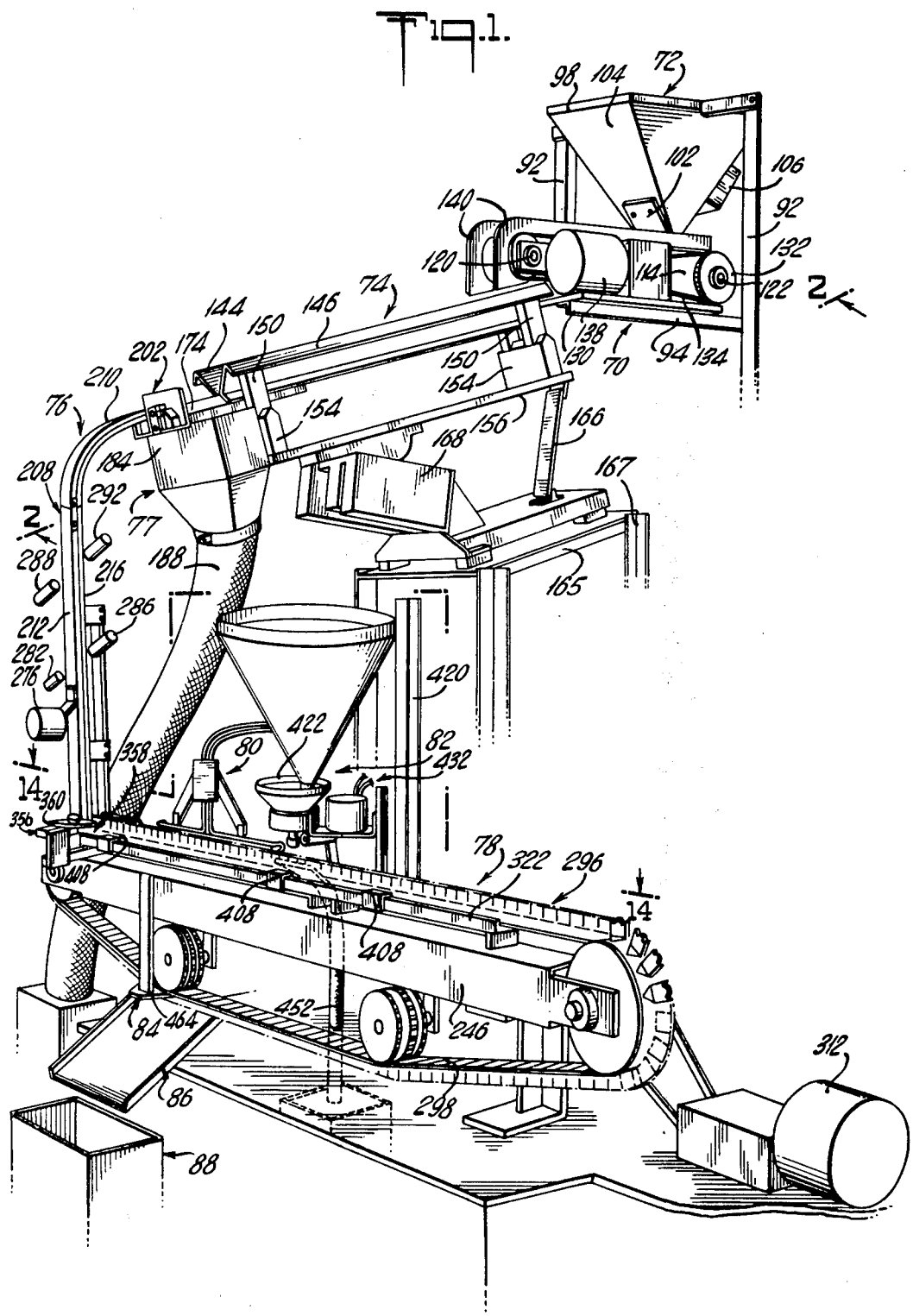

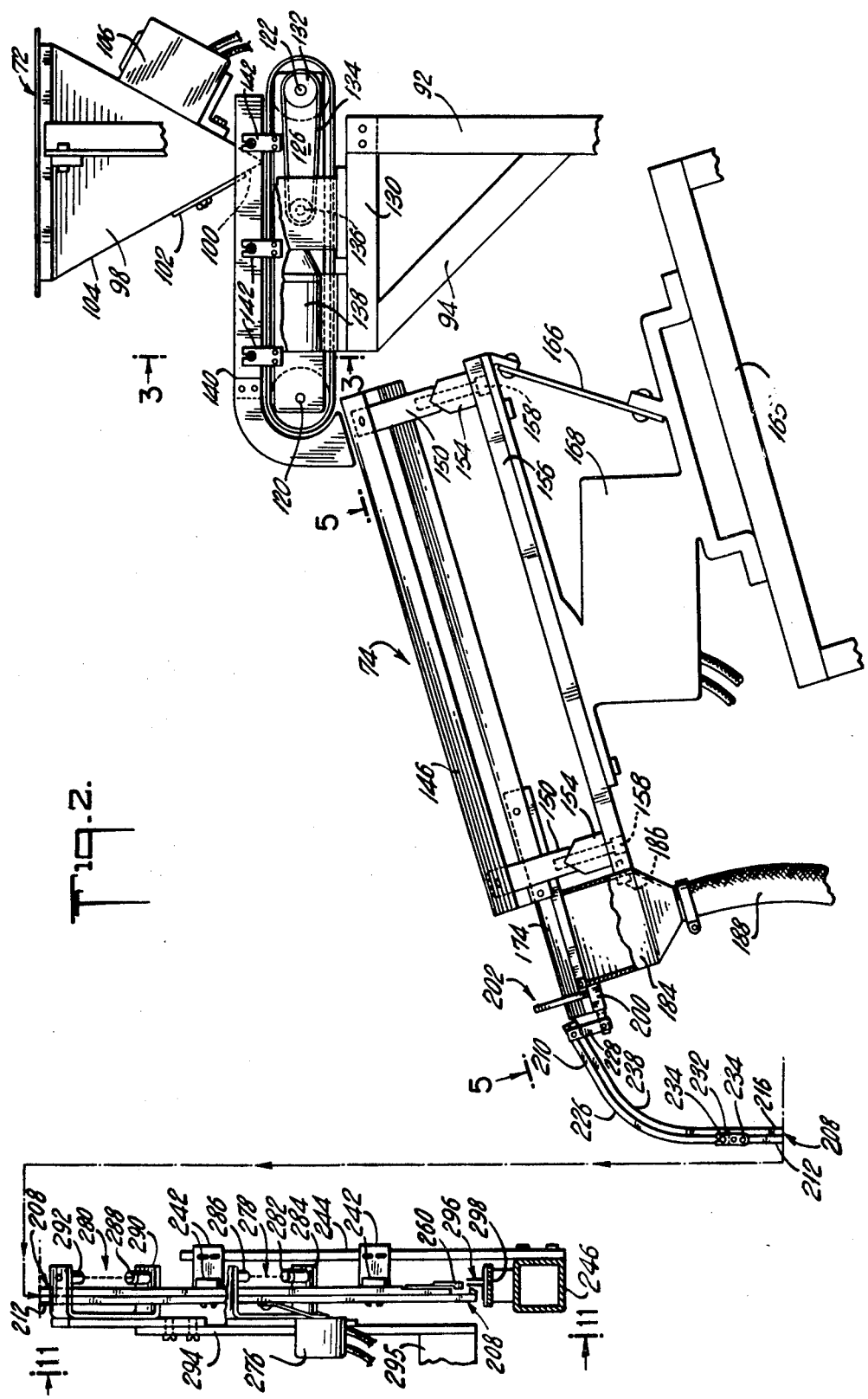

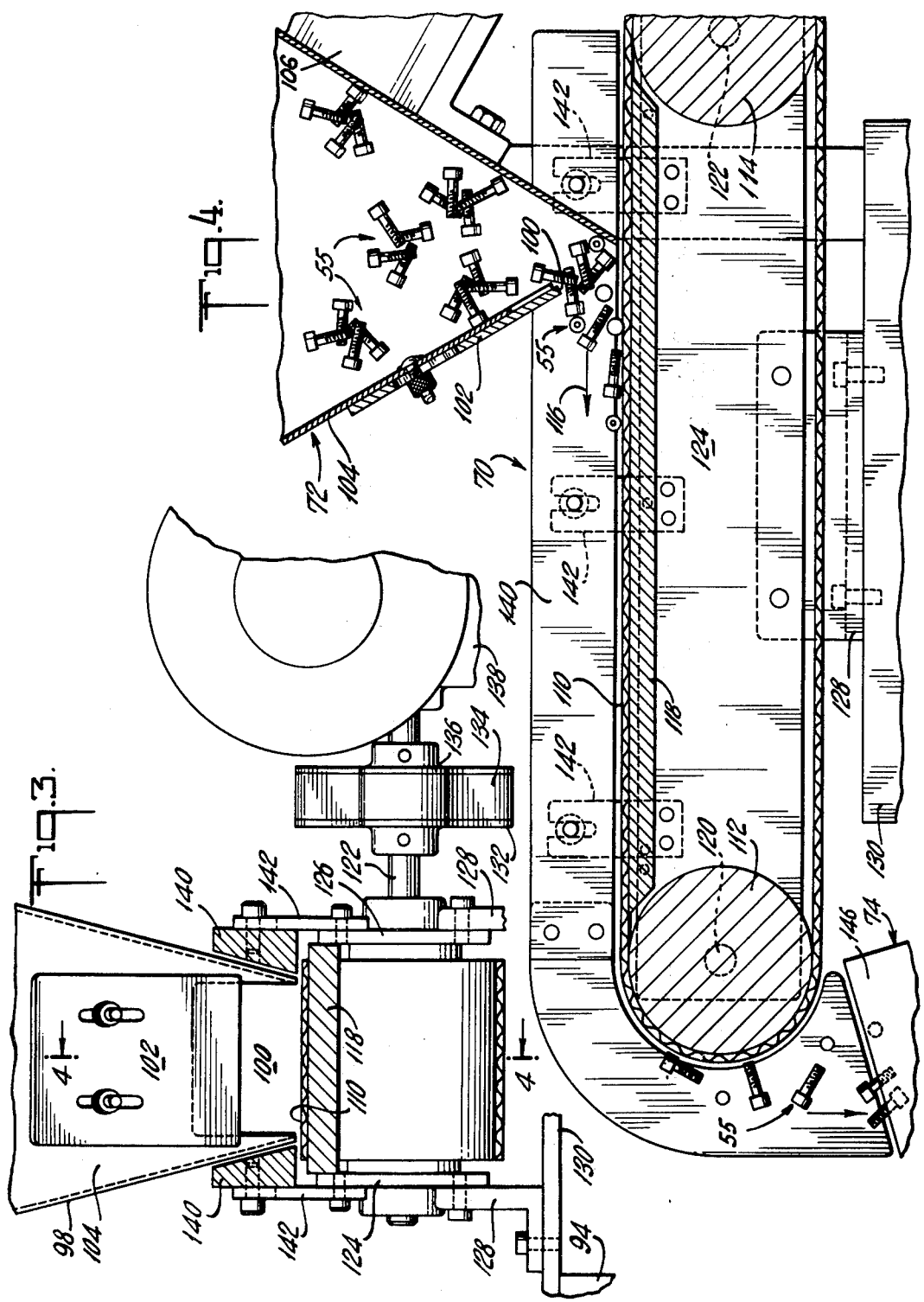

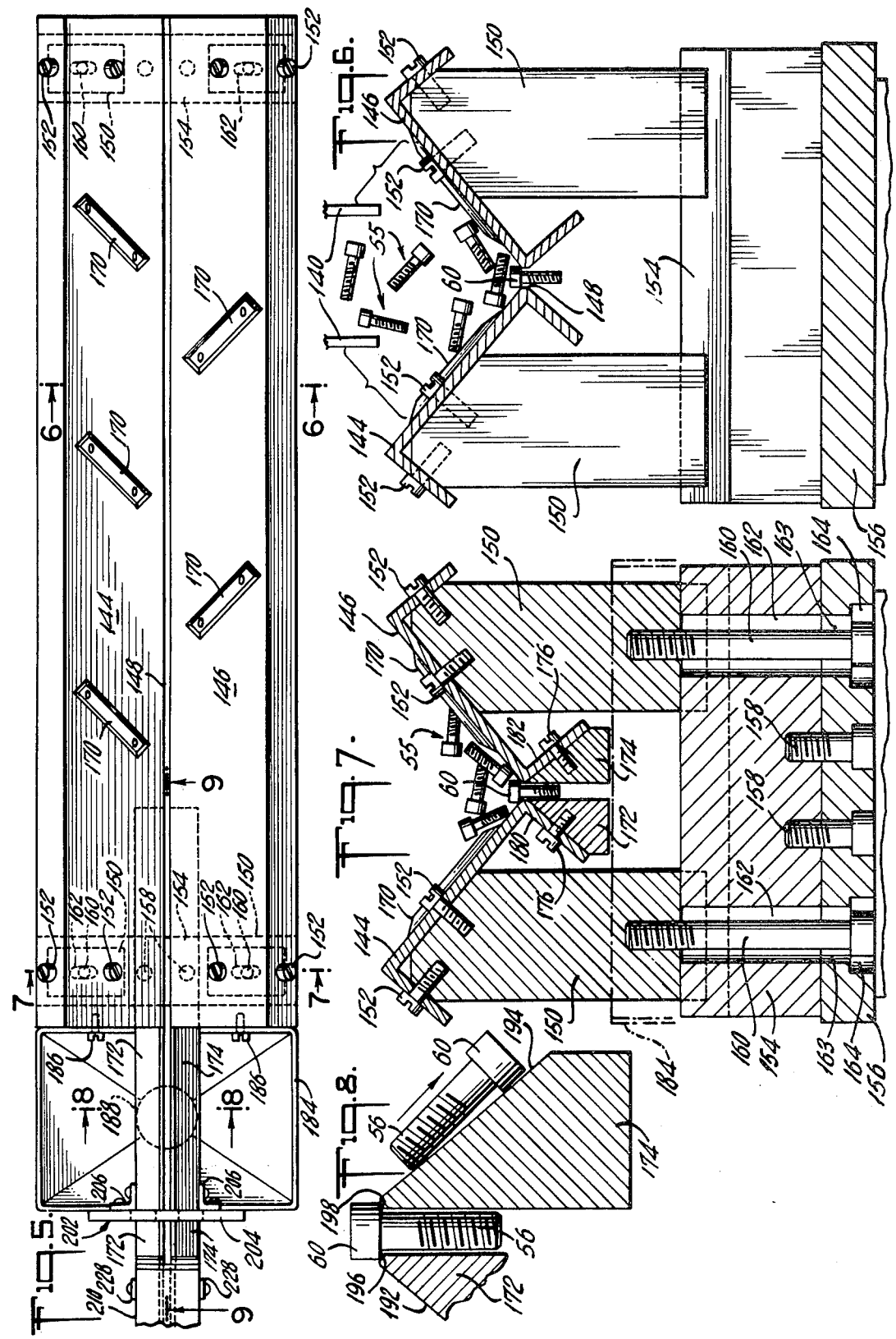

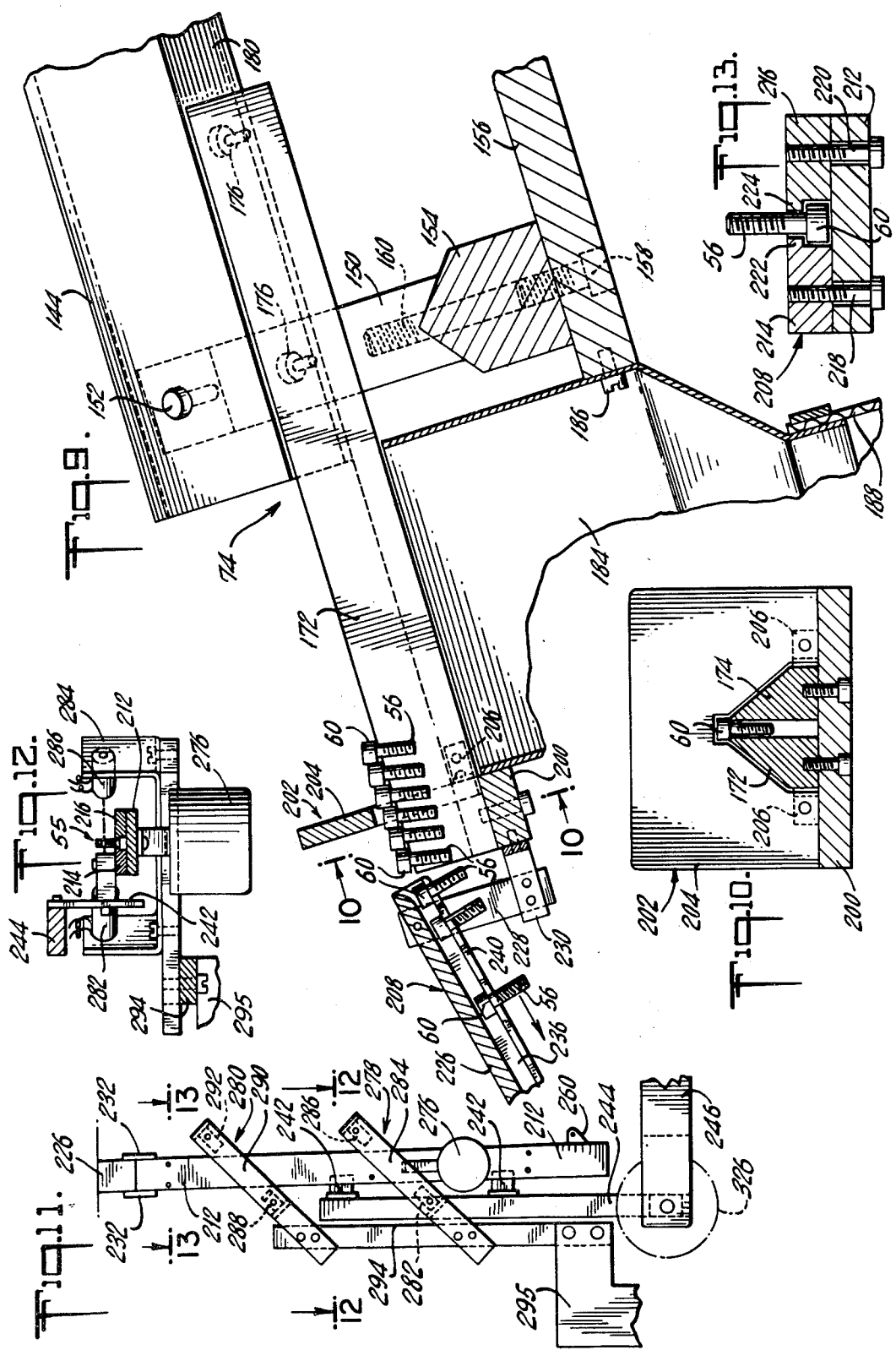

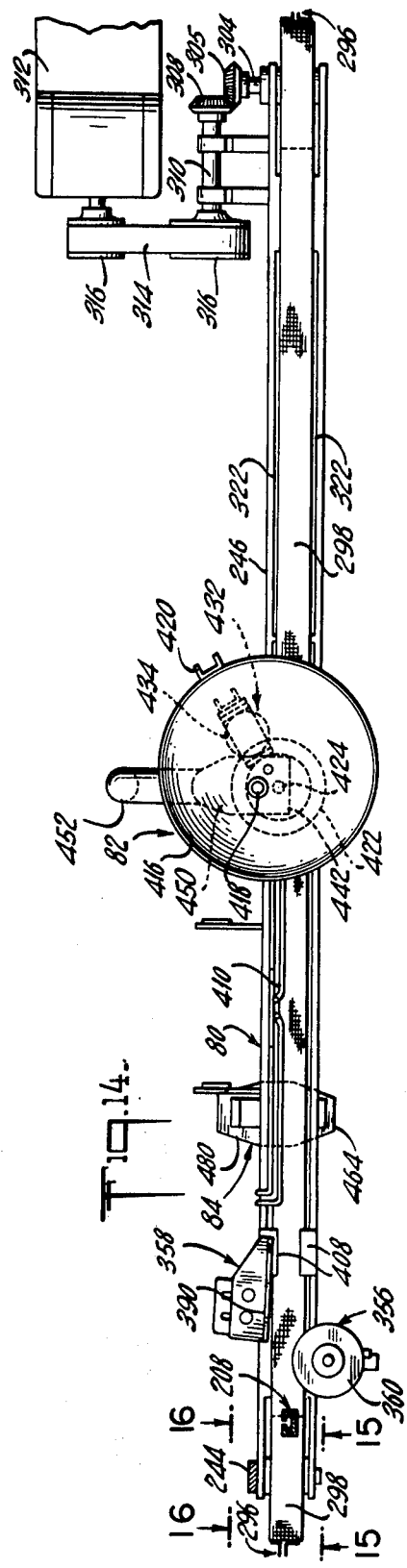

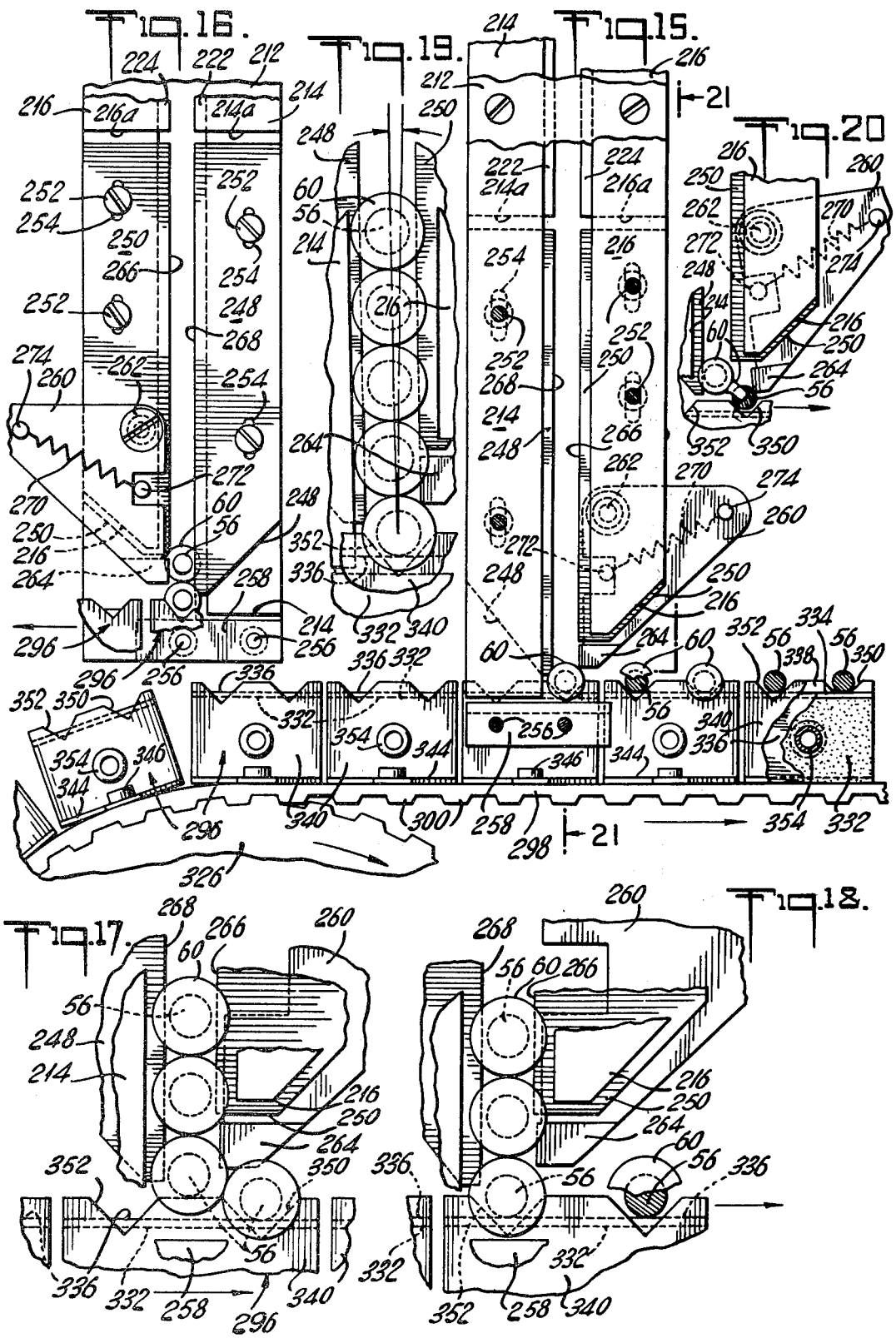

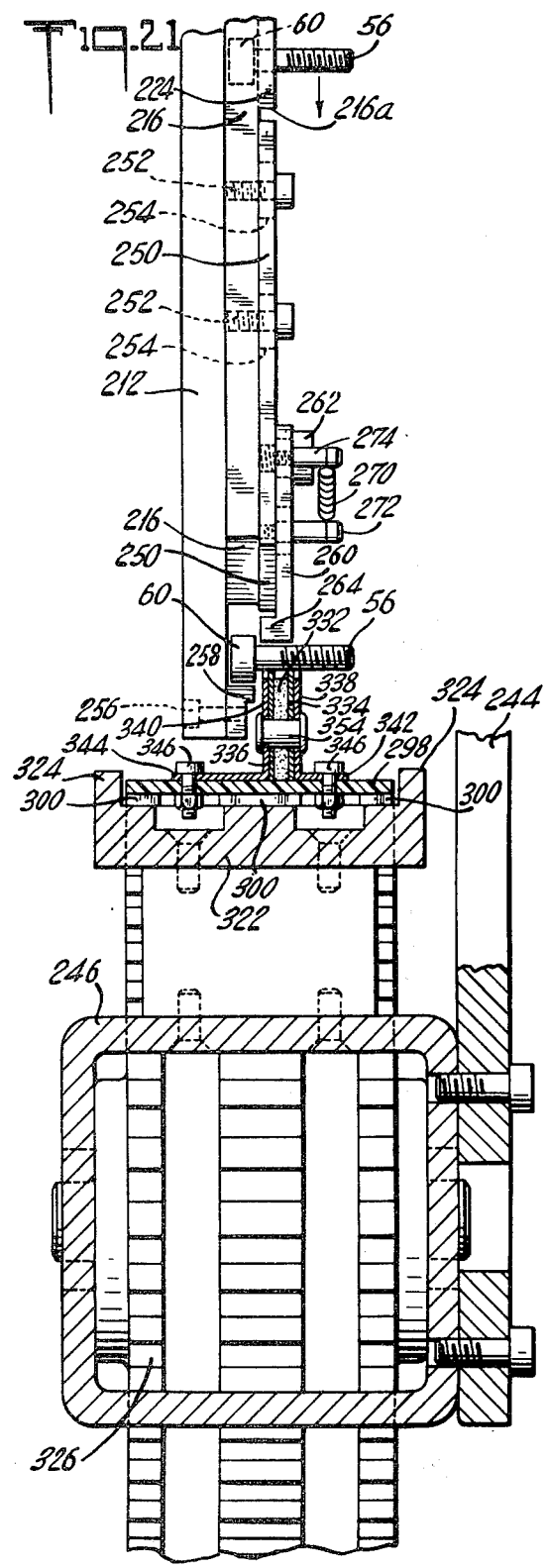

METHOD AND APPARATUS FOR ORIENTING AND STORING SIMILAR ARTICLES

This is a continuation of application Ser. No. 479,255, filed June 13, 1974, now abandoned, which is a division of application Ser. No. 270,191, filed July 10, 1972, now U.S. Pat. No. 3,831,736, which is a division of application Ser. No. 30,817, filed Apr. 22, 1970, now abandoned, which is a continuation of application Ser. No. 605,769, filed Dec. 29, 1966, now abandoned.

This invention relates to a method and apparatus for orienting and storing similar articles, particularly adaptable for use in the manufacture of self-locking externally threaded articles, such as screws, each having a plastic locking patch of limited axial extent bonded to the thread surface of the article. The invention helps to make possible the mass production of externally threaded articles as disclosed in Preziosi U.S. Pat. No. 3,294,139.

Self-locking screws having plastic inserts have been limited in use by reason of their high cost of manufacture. In manufacturing such a product it is necessary to form a hole, a groove, or a multiplicity of grooves, in the body of such screw; the hole, grooove, or grooves must be formed to precisely determined dimensions, within very close tolerances; a plastic member or insert must be made to precisely determined dimensions, within very close tolerances, and the screws and the preformed plastic inserts must be brought into precisely controlled positions of registration so that the inserts may be pressed into the hole, groove or grooves of the screws without causing damage to either the threads of the screws or to the inserts.

These essential requirements of any machine or method for assembling the plastic inserts and the self-locking screws seriously limit the rates and the costs of production and therefore significantly limit their fields of use.

Such plastic insert self-locking screws are further limited in use by reason of the fact that the hole or groove in each screw so reduces the strength of the screw that a given size plastic insert self-locking screw cannot compete in that respect with other types of self-locking screws of uninterrupted thread forms.

It is often not feasible or possible to redesign the product with which a plastic insert self-locking screw might usefully be employed, to accommodate, for reasons of reduced strength, a larger size screw than that called for by the original design.

It is accordingly an object of this invention to provide a method and apparatus for orienting and storing similar articles, particularly adaptable for use in the manufacture of plastic-metal self-locking screws or the like of high quality and high strength but at low cost as compared with plastic insert self-locking screws.

A further object of this invention is to provide a relatively inexpensive method and apparatus for effecting the orientation of similar items having a shank and a head of greater transverse dimension than said shank.

Another object of this invention is to provide a means for storing similar oriented articles prior to delivery to article receiving, positioning and carrying means.

Still a further object of this invention is to provide a means of maintaining a constant level of articles in the storing means.

To the accomplishment of the foregoing objects and advantages, the present invention briefly comprises a method and apparatus for orienting and storing similar articles each having a shank and a head of greater transverse dimension than the shank. An unoriented plurality of such articles are introduced into a trough including a pair of angularly related sides spaced apart at the bottom to provide an inclined slot into which the shanks can drop. Separation is achieved by effecting movement of the plurality of articles by means of a vibratory device and passing the plurality past cleats positioned at fixed locations on each of said sides. The oriented articles are then directed onto an elongated stacking track having a longitudinal aperture of substantially constant cross sectional shape and including a wide portion to receive the heads of the articles in abutting relationship and a narrow portion to receive the shanks of the articles in spaced parallel relation. Means are provided for returning those articles which fail to become oriented back into the trough.

The elongated stacking track includes an upper end for receiving the oriented articles, a straight lower portion of a length equal to at least several times the dimension of the transverse heads of the articles and a lower discharge end. Level maintaining means are included along the elongated stacking track to maintain the level of articles above a first point and below a second point. This is accomplished by the use of at least one electric eye device at each point capable of sensing the presence or absence of articles at that point.

The lower discharge means includes a pivotally mounted feed control plate which is resiliently deflectable by the shanks of each of the articles to faciliate in the delivery of the articles to article receiving, positioning and carrying means.

Other and further objects of the invention will be apparent from the following description when taken in connection with the accompanying drawings wherein:

FIG. 1 is a view in perspective of a preferred form of a machine embodying the present invention;

FIG. 2 is a fragmentary view in elevation of the machine of FIG. 1 as taken generally along the line 2—2 of FIG. 1 but with certain parts broken away for illustration purposes;

FIG. 3 is a fragmentary view in elevation and partly in section taken generally along line 3—3 of FIG. 2;

FIG. 4 is a fragmentary view in elevation and partly in section taken generally along the line 4—4 of FIG. 3;

FIG. 5 is a fragmentary plan view looking generally along the line 5—5 of FIG. 2;

FIG. 6 is an enlarged fragmentary sectional view taken generally along line 6—6 of FIG. 5;

FIG. 7 is an enlarged fragmentary sectional view taken generally along the line 7—7 of FIG. 5;

FIG. 8 is a further enlarged fragmentary sectional view taken generally along the line 8—8 of FIG. 5;

FIG. 9 is an enlarged fragmentary view in vertical section taken substantially along the line 9—9 of FIG. 5;

FIG. 10 is a fragmentary sectioned view taken generally along the line 10—10 of FIG. 9;

FIG. 11 is a fragmentary view in elevation looking generally along the line 11—11 of FIG. 2;

FIG. 12 is an enlarged fragmentary view in horizontal section taken generally along the line 12—12 of FIG. 11;

FIG. 13 is an enlarged fragmentary view in horizontal section taken generally along the line 13—13 of FIG. 11;

FIG. 14 is a fragmentary plan view, partly in section, looking generally along the line 14—14 of FIG. 1;

FIG. 15 is an enlarged fragmentary view in elevation looking generally along the line 15—15 of FIG. 14;

FIG. 16 is an enlarged view in elevation looking generally along the line 16—16 of FIG. 14;

FIGS. 17 and 18 are enlarged fragmentary views in elevation of a portion of the apparatus shown in FIG. 15 but with certain parts in different positions of operation;

FIG. 19 is an enlarged fragmentary view of a portion of the apparatus shown in FIG. 15 to better illustrate a certain relationship of the parts thereof;

FIG. 20 is a view in elevation of a portion of the apparatus shown in FIG. 15 but with a certain part in a different position of operation; and FIG. 21 is a fragmentary view in elevation and partly in section taken generally along the line 21—21 of FIG. 15.

A preferred embodiment of the machine as constructed in accordance with present invention, comprises a screw or other article supply means 70, FIG. 1, which includes a hopper 72 and which feeds articles, such as screws 55, each comprising a metal body 56 having an externally threaded shank portion and an enlarged head portion 60 (FIGS. 4, 6 through 10, 12, 13 and 15 through 21) in heterogeneous array from the hopper 72 to an article orienting and feeding means 74 which delivers oriented screws 55, in individual succession to article accumulator or storing means 76 and unoriented screws into collecting or discharge means 77, the article accumulator or storing means 76 delivering the screws one by one, in individual succession, to a main conveyor 78 which carries the screws in succession first past article heating means 80 and the heated articles then past powder dispensing means 82 and finally past article stripping means 84, which removes the screws 55 from the main conveyor 78 and causes them to be deposited in a chute 86 (FIG. 1) by which they are fed to a receptacle or quenching tank 88.

The plastic powder dispensing means 82 provides a free falling stream of plastic powder through which the heated articles are carried by the main conveyor 78, and the excess powder, i.e., that which is not deposited on the screws, is received in powder recapturing or collecting means 452.

For a more detailed explanation of article supply means 70, article heating means 80, powder dispensing means 82 and article stripping means 84, reference may be had to the aforesaid abandoned application Ser. No. 605,769 filed Dec. 29, 1966. For a more detailed explanation of main conveyor 78, reference may be had to the aforesaid U.S. Pat. No. 3,831,736.

Article supply means 70, best shown in FIGS. 1 and 4, comprises suitable supports 92 and 94 on which the hopper 72 is mounted in a convenient manner. The hopper 72 comprises a suitable receptacle or tank 98 having at its bottom an article discharging opening 100, the size of the opening 100 being controlled by an adjustable gate 102 adjustably mounted on a forward wall 104 of the hopper 72. A vibrator 106 of standard form is secured to the receptacle 98 to vibrate the same and thereby facilitate the rapid flow of the screws out of the hopper 72.

Article supply means 70 also includes a continuous flexible belt 110 mounted on drums 112 and 114, the belt 110 being driven in the direction of the arrow 116, FIG. 4, by the drum 114 and the upper flight of the belt being supported by a supporting plate 118.

The drums 112 and 114 are mounted upon suitable shafts 120 and 122 carried upon longitudinally extending plates 124 and 126 mounted upon suitable brackets, such as 128, secured to a platform 130 in turn secured to the support 94.

The drum 114 is fixed to the shaft 122 secured at one end to a pulley 132 driven by a belt 134, in turn driven by a pulley 136 secured to the shaft of an electric motor 138 mounted on the platform 130.

Article supply means 70 also includes side bars 140 which extend longitudinally of the belt 110 at its opposite sides to confine the articles to the belt as they are carried from the hopper 72 to the orienting means 74, the side bars extending downwardly at the forward end of the belt 110 so as to direct the screws onto the orienting means 74. The side bars 140 may be mounted in any convenient manner, as by brackets 142, to the side plates 124 and 126.

It should be noted that the article supply means 70, including the hopper 72, supplies screws in heterogeneous array at a very high rate in number of articles per unit of time to the orienting means 74.

Article orienting means 74, best shown in FIGS. 1, 2 and 5 to 10, includes a feed trough formed by inclined side plates 144 and 146 spaced at their lower ends to form a slot 148 of a size to receive the shanks of the screws but prevent the enlarged heads of the screws from passing through the slot. The side plates 144 and 146 are secured to the upper ends of two pairs of V-blocks or posts 150 as by bolts 152. The V-blocks 150 are adjustably supported on V-blocks 154 fixedly secured to a supporting plate 156 as by bolts 158. Bolts 160, threaded into the V-blocks 150, are secured in elongated slots 162, 163 and 164 in the V-blocks 154 and supporting plates 156 so that the V-blocks 150 may be adjusted toward and from each other.

The plate 156 is secured, in part, to a supporting platform 165 by a spring-like bar member 166 mounted on a suitable supporting framework 167. The plate 156 is also secured, at its forward end, to a vibrator 168 in turn secured to the platform 165. The vibrator 168 facilitates the gravitational movement of the screws down the trough from the article supply means 70 to the article accumulator or storing means 76.

The side walls 144 and 146 of the orienting trough are provided with a plurality of cleats 170 the peripheral edges of which are beveled to a relatively thin edge adjacent the trough side walls and the cleats themselves are inclined, from their upper edge to their bottom edge, in the direction of the moving screws. The cleats serve to change the relative speed of advance of the screws as they gravitate along the trough and, in conjunction with the vibration of the trough side walls, separate the screws from one another and facilitate the dropping of the shanks of the screws into the slot 148.

A pair of screw feeding bars or guides 172 and 174 are secured, as by bolts 176, to outwardly extending flanges 180 and 182 of the trough side walls 144 and 146, at the forward end of the trough, the bars 172 and 174 forming a guide chute extending forwardly and downwardly from the orienting trough to the accumulator or storing means 76.

Since bars 172 and 174 are secured to the trough side walls 144 and 146, bars 172 and 174 are adjustable therewith toward and from each other to vary the space between them as may be required to accommodate screws of various shank diameters. The vibrator 168 also serves to vibrate the bars 174 and 176 and thereby to assist in the gravitational movement of the screws down the chute to the accumulator.

The unoriented article collecting means 77 comprises a hopper 184 secured in any convenient manner as by bolts 186, to the forward end of plate 156. Hoppeer 184 is connected by a flexible tube 188 to a receptacle 190 from which the articles may be returned by the operator to the hopper 72 of the article supply means 70.

The bars 172 and 174 extend over the open mouth of the hopper 184 and are formed with downwardly and outwardly inclined surfaces 192 and 194 respectively, as best seen in FIG. 8, so that unoriented articles may slide downwardly into the hopper 184.

It should be noted that the inner surfaces of the trough side walls 144 and 146 merge at their lower ends into the upper surfaces 196 and 198 of the bars 172 and 174 so that there is no obstruction to the free movement of the oriented screws from the trough and along the bars 172 and 174.

The bars 172 and 174 are supported at the forward ends on a suitable block 200 secured in any convenient manner to the forward upstanding wall of the hopper 184. Gate means 202 is provided at the forward end of the hopper 184 to prevent unoriented screws from moving down the chute bars past the hopper. This gate means 202 may comprise a plate 204 extending about the bars 172 and 174 and having a recess over the upper surfaces of the bars to clear the heads 60 of the oriented screws passing over the hopper. The gate bar may be mounted for vertical adjustment, in any suitable manner not shown, on brackets 206 secured to the forward ends of the bars 172 and 174.

The article accumulator or storing means 76, best shown in FIGS. 1, 2, 5, 9, 11 to 13, and 15 to 21, preferably comprises a substantially vertical stacking track 208 to which the screws are delivered by a curved feed track 210 which extends from stacking track 208 to the forward end of the chute formed by the bars 172 and 174. Stacking track 208 comprises a bar 212 and bars 214 and 216 adjustably secured as by bolts 218 and 220 to the bar 212. The bolts 218 and 220 pass through elongated openings in bar 212 so as to permit adjustment of the bars 214 and 216 toward and from each other to accommodate screws having shanks of different diameters.

As best indicated in FIG. 13, the bars 214 and 216 are provided with confronting projections 222 andd 224 spaced from the surface of the bar 212 sufficiently to accommodate the heads of the screws and sufficiently spaced laterally from each other to permit the shanks of the screws to pass readily between the bars 214 and 216 but without permitting the screws to tilt downwardly or to be canted laterally.

The feed track 210 comprises a bar 226 similar to the bar 212 but curved to extend from the upper end of the bar 212 to a position spaced vertically above the bars 172 and 174 of the orienting means 74. The bar 226 is secured at its upper end to a generally vertical bar 228 in turn secured to a bracket 230 fastened to the block 200. The bar 226 is secured at its lower end, as by one or more plates 232 and suitable bolts 234, to the upper end of the bar 212 of the stacking track 210.

The track 210 includes, in addition to the bar 226, curved bars 236 and 238 similar to the bars 214 and 216 of the stacking track and similarly formed to provide confronting projections 240 similar to the projections 222 and 224 and receiving between them the shanks of screws having their heads resting on the inner surfaces of the projections 240. It should be noted that the inner surfaces of the projections 240 of the track bars 236 and 238 are spaced sufficiently from the confronting surface of the bar 226 to permit free movement of the screws down the bars 236 and 238 but yet hold the screws against any substantial tilting or canting relative to the track. It should also be noted that at the upper ends of the bars 226, 236 and 238, the confronting surfaces of the bars are shaped to form a "bell mouth" permitting ready movement of the screws from the bars 172 and 174 of the orienting means 74 into the feed track 210 and to form cam-like surfaces causing counter clock-wise movement of the screws relative to the guide bars of the track 210 to assume the proper position for movement down the track 210.

The stacking track 208 is secured by brackets 242, to an upstanding bar 244 secured at its lower end to an elongated box frame 246 forming part of the main conveyor 78. The bars 214 and 216 are recessed at 214a and 216a (FIGS. 16 and 21) to receive adjustable plates 248 and 250, which are secured to bars 214 and 216 for vertical adjustment, as by means of bolts 252 passing through vertically elongated holes 254 in each of the plates 248 and 250 and threaded into the bars 214 and 216.

The bar 212 also extends below the bars 248 and 250 and has secured to its inner face, as by bolts 256, a stop block 258 for engaging and supporting the head of the lower-most screw in the stacking track and thereby supporting the entire line of screws in the stacking track since the heads of the screws in that track are in abutting relation. Bar 216 and plate 250 terminate at their lower ends a distance from the top of the stop block 258 sufficient to permit lateral withdrawal of the screws 55 but bar 214 and plate 248 terminate a distance above the stop block 258 such that the lowermost screw may not escape from the stacking track below the plate 248.

A feed control plate 260 is pivotally mounted on a stud 262 carried by bar 250 and is provided with a laterally extending lug 264 the inner edge of which is in line with the inner edge of the shank guiding projection 266 of the bar 250.

The projection 266 cooperates with a like projection 268 of the plate 248 to form a guide slot for the shanks of the screws as they pass down plates 248 and 250. The lug 264 is vertically dimensioned to normally clean the shank of the lowermost screw as it moves laterally out of the stacking track but is engaged by the shank of a laterally moving screw which is not properly positioned on the stop block 258.

The control plate 260 is urged to its normal inner position by a spring 270 secured at one end to a fixed pin 272, secured to the plate 250, and at its other end to a pin 274 carried by the plate 260. The pin 272 also serves to engage the plate 260 to limit the inward movement of the plate under the action of the spring 270.

The mounting bar 244 for the stacking track 208 is sufficiently flexible to permit vibration of the track by a vibrator 276, secured in any convenient manner to the track bar 212. As is well known, the vibration of the stacking track facilitates the downward movement of the screws along the track.

In order to facilitate transfer of the screws from the stacking track 208 to the main conveyor 78 it has been found desirable to maintain a certain "head", or number or weight, of screws in the stacking track and, more specifically, it has been found desirable to maintain the level of screws in the stacking track above a predetermined minimum point and below a predetermined maximum point. For that purpose, the motor 138 of the article supply means is preferably of a two-speed type and the article accumulator or storing means 76 is provided with a level sensing motor control for causing the motor 138 to operate at a higher speed when the "head" of screws in the stacking track reaches a minimum level and to operate at a slower speed when the "head" of screws in the stacking track reaches a maximum level.

The motor control means may comprise a pair of electric eye units 278 and 280. The electric eye unit 278 comprises a photo-electric or light sensitive element, in a housing 282 secured to one arm of a U-shaped bracket 284 and a lamp or other light source, not shown, mounted in a housing 286 secured to the other arm of the U-shaped bracket 284. The electric eye unit 280 similarly comprises a photo-electric element, not shown, mounted in a housing 288 secured to one arm of a U-shaped bracket 290 and a lamp, or other light source, not shown, is mounted in a housing 292 secured to the other arm of bracket 290. The brackets 284 and 290 may be mounted in any convenient manner on an upright arm 294 in turn secured by a bracket 295 secured in any convenient part (not shown) of the machine frame so that the vibration of the stacking track 208 under the action of the vibrator 276 will not cause a vibration of the electric eye units.

The electric eye units are so mounted as to provide beams of light extending at a rather sharp vertical angle, across the path of movement of the shanks of the screws as the screws pass down the stacking track. The control circuit, not shown, by means of which the light sensitive element of the electric eye unit 278 controls the two-speed motor for high speed operation when light strikes the light sensitive element of that unit and by means of which the motor is controlled for low speed operation when light striking the light sensitive element of the electric eye unit 280 is interrupted, by more than a momentary interval, may be of any suitable and well-known type.

It should be noted that each of the electric eye units is so oriented that the axes of the light beams are sharply inclined to the vertical so as to minimize the generation of false impulses occasioned by the spacing of the shanks of the screws the heads of which are in abutting relation in the track.

It should be noted that, as shown in FIG. 19, the bars 214, 216, 248 and 250 of the stacking track are slightly inclined to the vertical so that the center line of the chute formed by those bars, and hence the axes of the screws in the track lie in a common plane angularly displaced, preferably in the range between about 2° and about 5°, from a vertical plane through the vertex of a screw receiving notch 350 or 352 positioned directly in line with and below the chute. This inclination of the chute bars assures a more smooth, free movement of the screws from the stacking track into and with the continuously moving fixtures.

The operation of the machine is best described with reference to FIG. 1. Motor 138, operatively connected to article supply means 70, and motor 312 having been energized along with vibrators 106, 168, 276 and 434 operatively connected to hopper 72, article orienting means 74, article accumulator or storing means 76 and powder dispensing means 82, respectively, a supply of screws are dumped into the hopper 72 and the gate 102 adjusted to insure a smooth flow of screws from the bottom of the hopper 72 to the surface of the belt 110 of the article supply means 70. The screws are carried in heterogeneous array by the belt 110 from the hopper 72 to the article orienting means 74 and are discharged into the inclined trough of the article orienting means. As the screws move down the trough, under the action of gravity assisted by the vibrator 168 the majority of the screws gravitate to a position, as illustrated in FIG. 6 where they are supported by the bottom edges of the trough side walls 144 and 146 and with their shanks extending downwardly. As before mentioned, the cleats assist in the orientation of the screws to the position just described and also serve to break up any group of screws which may have become entangled with one another.

Since the bottom edges of the trough side walls merge into the upper surfaces of the bars 172 and 174, the oriented screws continue to gravitate down the bars 172 and 174 and pass over the hopper 184 of the unoriented article collector means 77 and into the article accumulator or storing means 76. The screws are accumulated or stored in the stacking track 208, between minimum and maximum levels, as previously described. From the stacking track, the screws are fed one by one to the continuously moving magnetic fixtures 296 carried by the main conveyor belt 298. As each screw is carried away from the stacking track by a magnetic fixture, the head of the screw engages the article positioning control wheel 360 and moved thereby transversely of the fixture and the work entering end of each screw then engages cam bar 390 so that the screws as they move from the stacking track to the heating means 80 and then to the powder dispensing means 82 are positioned in precisely determined positions laterally of the screw holding fixtures. The magnetic fixtures 296 carry the screws serially between the bars 412 and 414 of the heating means 80 and then past the stream of powder supplied by the powder dispensing means 82. A predetermined limited quantity of plastic powder determined by the shape and dimension of the dispenser opening and the powder dispensing nozzle of the powder dispensing means 82 and by the speed of movement of the belt is deposited on the shank of each heated screw, the powder melting as it engages the heated thread surfaces of each screw and forming a free form liquid pool of selected thermoplastic material.

As the belt carries the screws with their patches of thermoplastic material adhered to the thread surfaces of the screws from the powder means, the screws are allowed to cool thereby solidifying and bonding the patches to that portion of the threaded surfaces which are wetted by the melted thermoplastic material. The screws magnetically retained on the belt by the magnetic fixtures 296 are then carried to the end of the upper flight of the belt and then along the lower flight of the belt until the screws in individual succession engage article stripper means 84 and are thereby discharged from the magnetic fixtures and into the discharge chute 86 by which they are carried into the receptacle, or oil-quenching tank 88.

The herein described method and apparatus, including fixtures 296, have been used successfully over long production runs to produce patches, as described, on 3/16 inch screws at a rate averaging in excess of 600 per minute.

It has been found that patch adherence can be enhanced if a suitable primer, such as an epoxy, is applied to the screws prior to patch application. This may be done by dipping, in known fashion.

The invention in both its method and machine aspects is well suited, as previously described, to the attainment of the stated objects and advantages but the details of such method and apparatus are not to be taken as limitations upon the scope of the invention except as those details may be included in the appended claims.

What is claimed is:

1. Apparatus for storing similar screws each having a shank and at one end thereof a head of greater transverse dimension than said shank and delivering said screws one at a time to screw receiving, positioning and carrying means moving in a predetermined direction on a predetermined horizontal path, said apparatus comprising an elongated stacking track having a smooth longitudinal aperture of substantially constant cross sectional shape and no abrupt changes in direction, said aperture including a wide portion to receive the heads of said screws in abutting relation and a narrow portion to receive the shanks of said screws in spaced parallel relation, said track and said aperture having a straight lower portion of a length equal to at least several times said transverse head dimension and terminating at a lower screw discharge end located above said path, said aperture in said lower portion thereof being so oriented that the axes of the screws therein will be horizontal and crosswise of said path, and the longitudinal center line of said aperture in said lower portion making an angle with the vertical, such that a screw in said lower portion will tend to push a screw beneath it in said predetermined direction, said track and said aperture at said discharge end defining a lateral opening facing said predetermined direction for facilitating exiting of said screws, and wherein a feed control plate is pivotally mounted on said track adjacent said lateral opening and is resiliently deflectable by the shank of each said screw as it exits through said opening, whereby said feed control plate urges each of said discharged screws into article receiving position on said receiving, positioning and carrying means for movement in said predetermined direction along said path.

2. Apparatus of claim 1 wherein said angle is between about 2° and about 50°.

3. Apparatus of claim 1 further including a vibrator for vibrating said track.

4. In combination, (a) means for storing similar oriented articles each having a shank and head of greater transverse dimension than said shank, and delivering said articles one at a time to article, receiving, positioning and carrying means, said storing means comprising an elongated stacking track having a smooth longitudinal aperture of substantially constant cross sectional shape and including a wide portion to receive the heads of said articles in abutting relationship and a narrow portion to receive the shanks of said articles in spaced parallel relation, said track having an upper end for receiving oriented articles and a straight lower portion of a length equal to at least several times said transverse head dimension and terminating at a lower discharge end, said track and said aperture at said discharge end defining a lateral opening facing said predetermined direction for facilitating exiting of said articles and wherein a feed control plate is pivotably mounted on said track adjacent said lateral opening and resiliently deflectable by the shank of each said article as it exits through said opening, whereby said feed control plate urges each of said discharged articles into article receiving position on said receiving, positioning and carrying means for movement in said predetermined direction along said predetermined path;

(b) means in advance of said storing means for orienting said articles and delivering the oriented articles at an adjustable rate to said upper end of said track, said means comprising a downwardly inclined trough having a pair of angularly related sides spaced apart at the bottom to provide an inclined longitudinal slot into which the shanks of said articles can drop and a vibrator for vibrating said trough, wherein each of said angularly related sides includes a plurality of cleats positioned at fixed locations thereon, each of said cleats being inclined at an oblique angle toward said slot in the direction of advance of said articles along said trough for changing the relative speed of advance of the articles along said trough, thus to separate said advancing articles from one another to facilitate the dropping of the shanks of some of said articles into said slot; and (c) level maintaining means for maintaining the level of said articles above a first point and below a second point in said straight lower portion of said track by sensing the presence or absence of articles at each said point and increasing said adjustable rate when said level is below said first point and decreasing said adjustable rate when said level is above said second point, wherein said level maintaining means includes a pair of electric eye devices positioned at each of said points on either side of said track, each of said at least one pair being adapted to sense the presence or absence of the shank of an article at each of said points and wherein each of said at least one pair of electric eye devices is oriented along a direction making an oblique angle with respect to a perpendicular to said direction of movement of said articles relative to said track.

* * * * *